United States Patent [19]

Wittke

[11] Patent Number: 5,020,627

[45] Date of Patent: Jun. 4, 1991

[54] FOUR-WHEEL DRIVE TRACTOR

[76] Inventor: Rudolp H. Wittke, 1659 Glenny Ave., Waterloo, Iowa 50702

[21] Appl. No.: 582,805

[22] Filed: Sep. 12, 1990

Related U.S. Application Data

[63] Continuation of Ser. No. 341,618, Apr. 21, 1989, abandoned.

[51] Int. Cl.$^5$ .................... B62D 5/00; B62D 7/00
[52] U.S. Cl. .................... 180/234; 180/163; 180/242; 180/900; 280/91; 280/95.1
[58] Field of Search ............ 180/234, 242, 233, 235, 180/154, 155, 156, 157, 158, 162, 163, 900; 280/91, 95.1

[56] References Cited

U.S. PATENT DOCUMENTS

| | | | |
|---|---|---|---|
| 2,357,742 | 9/1944 | Jeffrey | 180/234 X |
| 3,236,324 | 2/1966 | Levratto | 180/234 |
| 3,351,147 | 11/1967 | Williamson | 180/234 X |
| 3,596,730 | 8/1971 | Cecce | 280/91 X |
| 3,727,938 | 4/1973 | Goodbary et al. | 180/234 X |
| 4,446,941 | 5/1984 | Laurich-Trost | 180/149 X |

FOREIGN PATENT DOCUMENTS

| | | | |
|---|---|---|---|
| 1004715 | 11/1951 | France | 180/234 |
| 1190585 | 4/1959 | France | 180/234 |
| 585692 | 11/1958 | Italy | 180/234 |

Primary Examiner—Mitchell J. Hill
Attorney, Agent, or Firm—Allan L. Harms

[57] ABSTRACT

A highly maneuverable four-wheel drive, four-wheel steer tractor is provided with hydraulic motors mounted at each wheel to drive the wheels. Each wheel and associated hydraulic motor is pivotable relative to the frame of the tractor. Steering is accomplished at all four wheels simultaneously by use of a hydraulic piston which rotates a longitudinal bar suspended under the frame. The elongated bar drives tie rods to the wheel and motor assemblies to cause steering deflection. The front wheels steer oppositely to the rear wheels to reduce the turning radius of the tractor.

22 Claims, 3 Drawing Sheets

FOUR-WHEEL DRIVE TRACTOR

This is a continuation of application Ser. No. 341,618, filed Apr. 21, 1989, now abandoned.

BACKGROUND OF THE INVENTION

This invention pertains to tractor vehicles for use in confined spaces including for gardening, light farm and industrial chores and similar medium duty uses.

Existing garden and small utility tractors are powered by internal combustion engines driven with mechanical transmission gearing and are steered by changing the angle of attack of the paired front wheels. Power to the rear wheel pair drives the vehicle. The rear wheels are driven in paired cooperation upon a common axle. Four-wheel drive tractors have the front pair of wheels also cooperatively driven on a common axle. This construction limits the turning radius of the tractor because stability considerations require constraints on front steering range of motion.

SUMMARY OF THE INVENTION

The instant invention pertains to tractor vehicles and in particular to highly maneuverable tractors, such as utility or garden tractors which must be used in confined areas and require a small turning radius.

A four-wheel driven utility tractor is disclosed which is steered at all four wheels in concert. An internal combustion engine applies power to a hydraulic pump centrally operable on the device. Ducts transmit hydraulic fluid under pressure to hydraulic motors operable at each of the four wheels. The hydraulic pump is fully reversible as selected by the operator, thereby providing drive force through hydraulic fluid pressure to exert reverse drive forces on the four drive motors at the wheels.

An elongated bar mounted longitudinally in the vehicle and rotatable relative thereto is provided with a first drive lever depending orthogonally therefrom and spaced therealong. Additional levers are provided along the elongated bar and positioned adjacent the paired wheels. The first drive lever is fixed along its length to a hydraulically operated piston which is selectively extended or drawn in through valves operated by the steering wheel. The other levers are connected along their lengths by tie rods which direct steering force to the wheels, when the bar is rotated by the first drive lever. Arrangement of the drive levers along the bar provides steering forces to the two pairs of wheels in opposing directions.

Each wheel is mounted to a yoke structure wherein is mounted the hydraulic motor for the associated wheel. Each yoke structure is pivotal on a generally vertical axis relative to the frame of the tractor.

One object of the invention is to provide a tractor which is driven synchronously at its wheels.

Another object of the invention is to provide a four-wheel drive, four-wheel steering tractor.

Another object of the invention is to provide a very maneuverable tractor.

These and other objects will be apparent from review of the detailed description which follows.

DESCRIPTION OF THE DRAWING FIGURES

DETAILED DESCRIPTION OF THE INVENTION

Figure 1:
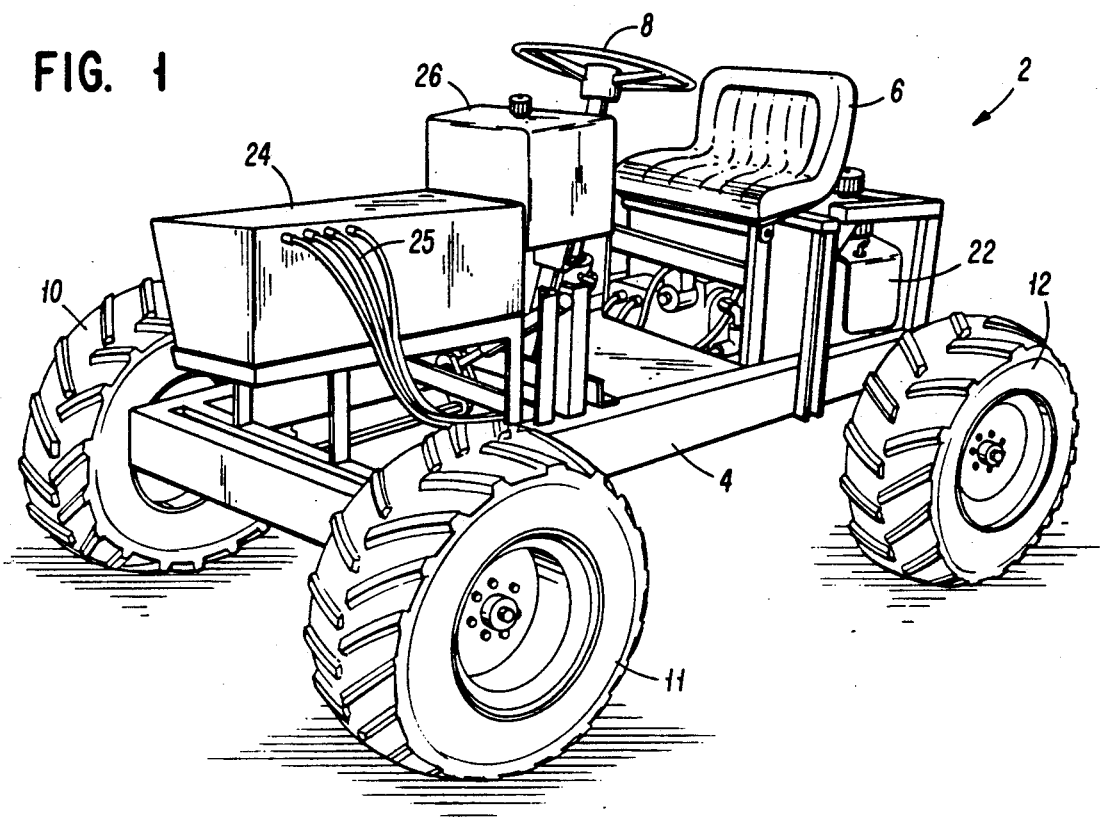
FIG. 1 is a front perspective view of the tractor invention.
Figure 2:
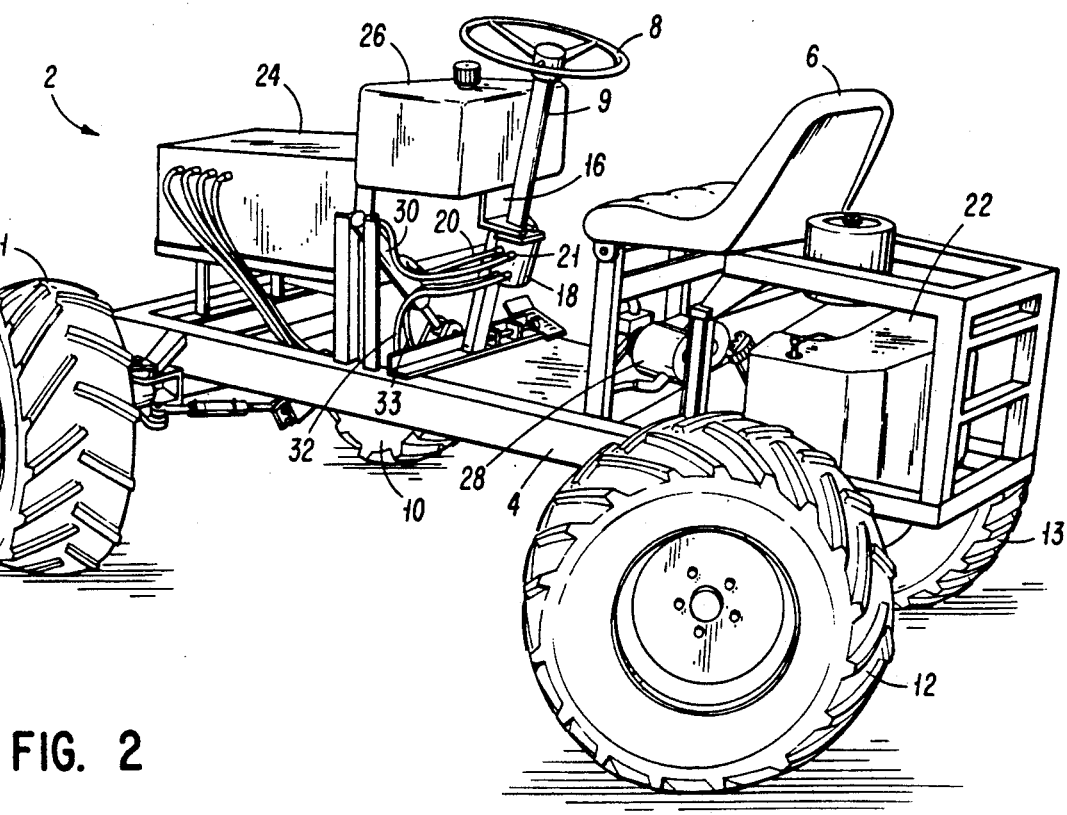
FIG. 2 is a side perspective view of the invention showing the wheel arrangement when the novel steering mechanism is employed.

Referring now to the drawings and in particular to FIGS. 1 and 2, the four-wheel drive, four-wheel steer tractor of invention 2 is shown in front and side perspective views, respectively. A frame 4 is supported by wheels 10, 11, 12 and 13. In the preferred embodiment, frame 4 is generally rectangular and wheels 10, 11, 12 and 13 support frame 4 generally at the corners thereof. It should be understood that other configurations of frame 4 and arrangements thereon of supporting wheels may be employed. A seat 6 is provided upon frame 4 to provide an operator's support. Steering wheel 8 mounts to steering wheel shaft 9 which is rotatably mounted to frame 4 at bracket 16. Steering wheel shaft 9 is operatively mounted to steering valve 18.

Engine 22 is supported upon frame 4 and mounted thereto. Fluid reservoir 24 is also mounted to frame 4 and contains a supply of working fluid. Hoses 25 communicate between reservoir 24 and pump 28. Fuel tank 26 is provided on frame 4 and provides a reservoir of gasoline to internal combustion engine 22 in the preferred embodiment. Hydraulic pump 28 is operatively connected to engine 22. Piston cylinder 30 is interconnected to steering valve 18 by ducts 20 and 21. Steering valve 18 is interconnected to hydraulic pump 28 by ducts 32 and 33. Pressure for the working fluid associated with invention 2 is provided by hydraulic pump 28 which is driven by engine 22.

Figure 3:
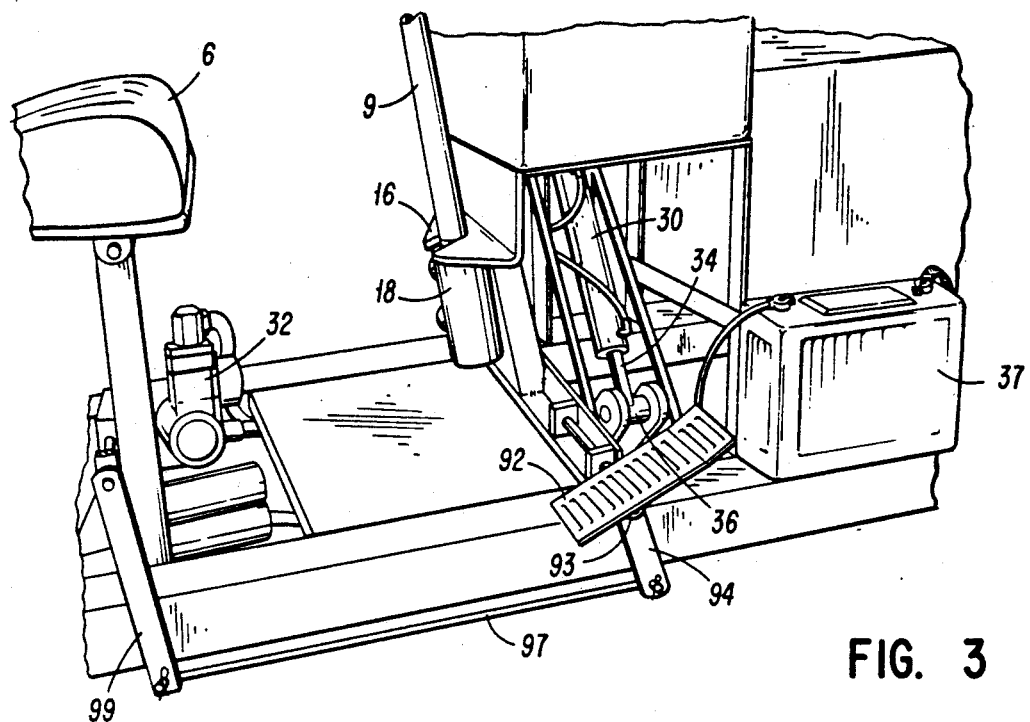
FIG. 3 is an enlarged perspective view of the steering components of the invention.
Figure 4:
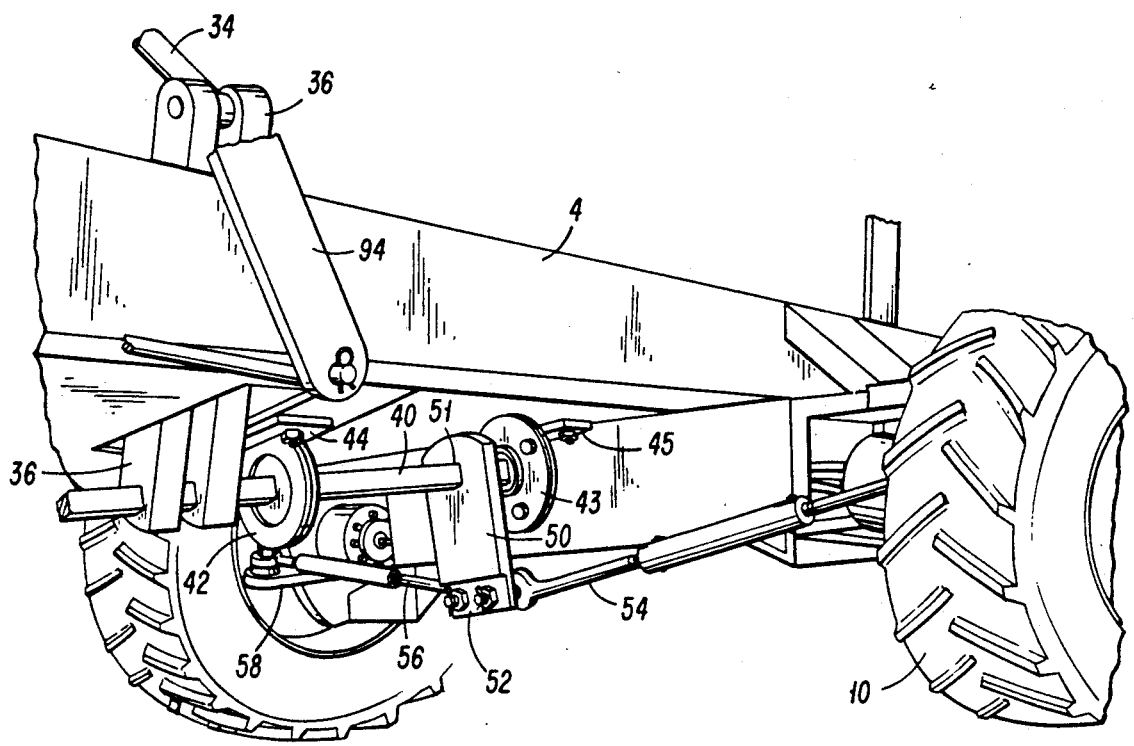
FIG. 4 is a perspective view of the front undercarriage of the invention.
Figure 5:
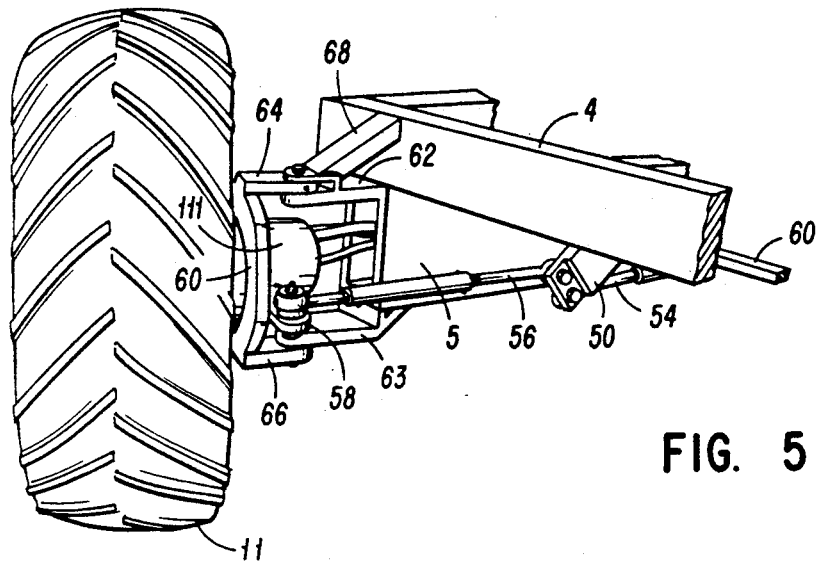
FIG. 5 is an enlarged perspective of one of the front wheel assemblies of the invention.

Referring now to FIGS. 3, 4 and 5, the components of the novel steering components can be visualized.

Piston cylinder 30 is equipped with piston arm 34 which mounts to lever assembly 36. Lever assembly 36 is fixed to elongated bar 40 which is longitudinally mounted to frame 4 at bearing housings 42 and 43. Elongated bar 40 is rotatable within bearing housings 42 and 43 which are fixed to frame 4 at mounting plates 44 and 45 respectively. Lever assembly 36 interconnects piston arm 34 and elongated bar 40 thereby providing rotational moment forces to elongated bar 40 when piston arm 34 is reciprocated within piston cylinder 30. In the preferred embodiment, elongated bar 40 is of generally square cross section but it is to be understood that other cross sectional shapes for bar 40 are contemplated. Rotational moment applied to elongated bar 40 by lever assembly 36 causes rotation of elongated bar 40 which transmits the rotational moment to lever 50 which is mounted to elongated bar 40 along first end 51 of lever 50. Second end 52 of lever 50 is attached to paired tie rod assemblies 54 and 56 such that each of tie rod assemblies 54 and 56 may pivot relative thereto. Tie rod assembly 56 extends from lever 50 to arm 58 of wheel 13 where it is pivotally mounted. It is to be understood that the structure obstructed from view by wheel 10 essentially mirrors that of wheel 11.

An electrical storage battery 37 is provided for starting power for engine 22.

In FIG. 5, the detail of the structure of front wheel 11 may be seen. Wheel 11 is rotatably mounted to yoke 60 which supports drive motor 111 therewithin. Yoke 60 mounts at vertically separated upper arm 64 and lower arm 66 thereof to top bracket 62 and bottom bracket 63 of beam 5 which is fixedly mounted to frame 4. Brace 68 provides support to top bracket 62. Yoke 60 may pivot relative to bracket 62 due to pin mountings to bracket at upper arm 64 and lower arm 66 of yoke 60. Arm 58 mounts to yoke 60 in a fixed fashion such that lateral angular rotation of arm 58 coincides with lateral angular rotation of yoke 60 and hence of wheel 11. As is readily obvious, the angular displacement of lever 50 transmits axial forces to tie rod assembly 56 which transmits these forces to arm 58 which responds by angular displacement relative to frame 4.

Figure 6:
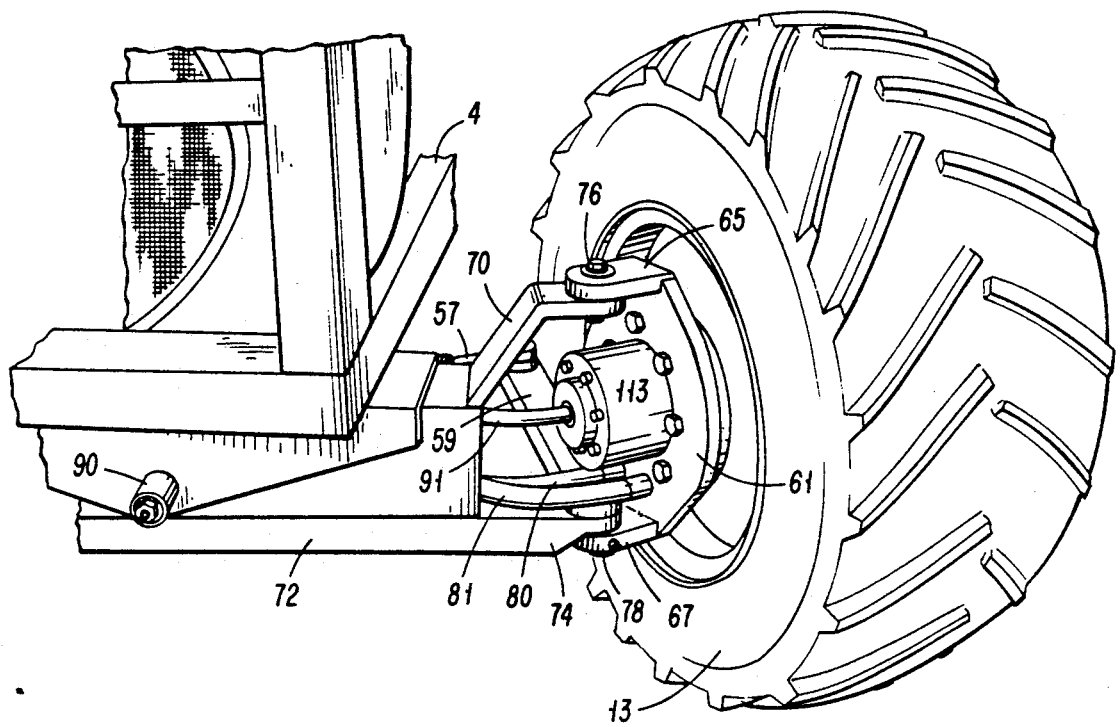
FIG. 6 is an enlarged perspective of one of the rear wheel assemblies of the invention.

Drawing attention now to FIG. 6, the components of the steering and drive mechanisms are seen at rear wheel 13 which is mounted to a yoke 61 similarly to the mounting of front wheel 11 of FIG. 5. Though not illustrated in the drawing figures, the steering components associated with rear wheels 12 and 13 are generally identical to those illustrated as associated with front wheels 10 and 11, that is, elongated bar 40 extends to the rear of invention 2 and is supported by rotatable bearings on frame 4. Another lever generally identical to lever 50 depends from a fixed mounting on elongated bar 40 and is coupled by tie rod means to yokes mounted to wheels 12 and 13, as by yoke 61 of FIG. 6. Tie rod assembly 57 can be partially seen in FIG. 6 pivotally mounted to arm 59 which is fixed to lower arm 67 of yoke 61. Upper arm 65 is supported by upper support arm 70 of suspension member 72. Extension 74 of suspension member 72 mounts to lower arm 67 of yoke 61. As can be seen, yoke 61 may pivot about suspension member 72 on a generally vertical axis provided by pins 76 and 78.

The novel drive mechanism is disclosed in FIGS. 3 and 6. Hydraulic motor 113 is carried upon yoke 61 and is driven by compressed fluids travelling along ducts 80 and 81, being alternatively high pressure and return lines respectively for hydraulic fluid depending upon the direction of rotation desired for hydraulic motor 113. The output of hydraulic motor 113 is directly coupled to wheel 13, thereby selectively effectuating rotation of wheel 13 in either a clockwise or counterclockwise direction. Working fluid is provided from main valve 23 where it is selectively directed to the hydraulic motor of each wheel. Pressurized fluid is provided to main valve 23 by hydraulic pump 28.

Braking of wheel 13 is carried out by well known rotor and caliper means controlled by hydraulic fluids passing through hose 91.

Suspension member 72 mounts by axle 90 to frame 4, thereby allowing limited rocking of suspension member 72 relative to frame 4.

Referring again to FIG. 3, steering valve 18 can be seen coupled to steering shaft 9. Steering valve 18 is operable such that rotation of steering shaft 9 cause the opening of valve 9 to permit passage of pressurized fluid along one of ducts 20 and 21 to piston cylinder 30 to effectuate either extension or return of piston arm 34.

Speed and direction control of invention 2 is provided by footplate 92 which mounts to lever arm 94 and pivots with lever arm 94 about axle pin 93. Footplate 92 is actuated by the foot of the operator who would apply clockwise force to footplate 92 and lever arm 94 to effectuate forward motion and counterclockwise force to footplate 92 and lever arm 94 to effectuate reverse motion of invention 2. The rotation of lever arm 94 transmits longitudinal movement to rod 97 which moves arm 99 which selectively effects the opening of main valve 32 (which is reversible) permitting pressurized fluid to be transmitted through ducts to the hydraulic motors associated with each of wheels 10, 11, 12 and 13.

OPERATION OF THE INVENTION

Engine 22 is operated to provide drive means for hydraulic pump 28 which introduces pressure to the working hydraulic fluid. Steering of all four wheels in concert is effectuated by the application of pressurized working fluid to a reversible steering valve 18 which is selectively controlled by the operator's use of steering wheel 8. Steering valve 18 selectively restricts and directs the flow of the working fluid. When the invention 2 is to be steered in a right-hand direction, steering valve 18 is opened to allow a pathway of working fluid through duct 20 to piston cylinder 30 causing piston arm to extend from piston cylinder 30. The extension of piston arm 34 causes rotation of elongated bar 40 due to the action of lever assembly 36 upon it due to the coupling of lever assembly 36 to piston arm 34 and to elongated bar 40. Elongated bar 40 transmits the rotational force along its length thereby causing angular displacement of lever 50 and angular displacement of a generally identical second lever (not seen in the drawings) associated with rear wheels 12 and 13. The angular displacement of lever 50 effectuates rotation about a generally vertical axis for wheels 10 and 11 when a yoke associated with those wheels (illustrated by yoke 60 associated with wheel 11) are urged into lateral displacement by the coupled action of tie rod assemblies 54 and 56 respectively. Because tie rod assembly 56 is mounted rearwardly of the center of wheel 11, wheel 11 is turned to an angle of attack for a right-hand turn. Wheel 10 works in similar fashion when its associated tie rod arm is drawn toward the center of frame 4 by tie rod assembly 54.

When a left-hand direction is desired, steering shaft 9 causes steering valve 18 to open in a reverse direction, thereby supplying working fluid through duct 21 to piston cylinder 30 and thereby causing piston arm 34 to retract.

Generally similar tie rod assemblies couple the second lever depending from elongated bar 40 to arms (illustrated by arm 59 of FIG. 6) associated with the mounting yokes of wheels 12 and 13. Tie rod assemblies for rear wheels 12 and 13 are mounted forward of wheels 12 and 13 and thereby cause the angle of attack of wheels 12 and 13 to be directly converse to the angle of attack of front wheels 10 and 11. Because of this function, tight turning radii of invention 2 may be achieved.

The availability of this novel steering structure is permitted because of the novel drive mechanism provided. Forward motion of invention 2 is obtained by the operation of footplate 92 coupled by lever arm 94 and rod 97 to main valve 23 which directs fluid to the hydraulic motors associated with each of wheels 10, 11, 12 and 13, which hydraulic motors are mounted within the yokes which support the wheels, such as is seen in FIG. 6 where yoke 61 supports hydraulic motor 113 which is available to drive wheel 13.

The application of pressurized working fluid from the main valve 23 to each of the wheels 10, 11, 12 and 13 causes their simultaneous rotation about their hubs at generally identical rotational speeds. As footplate 92 is further rotated in a clockwise direction, the amount of pressurized fluid flowing to the hydraulic motors increases and thereby increases the speed of rotation of wheels 10, 11, 12 and 13. Because no common axles are utilized, both steering and drive of the wheels may be accomplished. Counterclockwise rotation of footplate 92 slows forward motion by reducing the flow of working fluid to hydraulic motors until flow is stopped. Further counterclockwise rotation of footplate 92 opens main valve 23 in a reverse direction, directing flow of working fluid down alternative ducts to hydraulic motors (such as hydraulic motor 113), thereby effecting reverse angular motion of the hydraulic motors which then drive the wheels in a reverse direction.

By the novel use of hydraulic motors carried on yokes which rotate about vertical axes relative to frame 4, drive of all four wheels of invention 2 may be accomplished while steering of all four wheels may also be carried out.

Having described the invention, I claim:

1. Tractor apparatus comprising
   an elongated frame supported by a plurality of rotatable wheels,
   at least one of said wheels capable of pivot relative to said frame about a generally vertical axis,
   an engine mounted to said frame,
   an elongated bar mounted longitudinally upon said frame and axially rotatable relative thereto,
   a pump driven by said engine and operative upon a working fluid,
   a piston selectively driven by said working fluid,
   said piston operatively interconnected to said elongated bar,
      said elongated bar axially rotatable by action of said piston,
   said elongated bar operable upon at least one of said wheels to cause said wheel to pivot upon said frame.
2. The invention of claim 1 wherein
   said piston interconnected to said elongated bar by a lever member.
3. The invention of claim 1 wherein
   at least one lever member mounted to said bar,
   said lever member operable upon at least one of said wheels to cause said wheel to pivot upon said frame.
4. The invention of claim 1 wherein
   said plurality of wheels being four wheels,
   said wheels mounted uniformly on said frame,
   two of said wheels being pivotable in cooperative opposing paired interrelationship.
5. The invention of claim 4 wherein
   at least one lever member mounted to said bar,
   said lever member operable upon said two interrelated wheels to cause said wheels to pivot upon said frame.
6. The invention of claim 5 wherein
   the remaining two of said wheels being pivotable in cooperative opposing paired interrelationship.
7. The invention of claim 6 wherein
   at least a second lever member mounted to said bar,
   said second lever member operable upon said remaining two interrelated wheels to cause said wheels to pivot upon said frame.
8. The invention of claim 4 wherein
   each of said wheels mounted to said frame by a support member,
   each of said support members being pivotable upon said frame,
   each of said support members having a motor mounted thereto,
   each of said motors selectively driven by said working fluid.
9. The invention of claim 8 wherein
   each of said support members is a yoke having spaced apart arms,
   each of said motors is a hydraulic motor mounted between said spaced apart arms.
10. The invention of claim 9 wherein
    said engine means is an internal combustion engine.
11. A tractor comprising
    a rectangular frame supported upon four wheels positioned generally at the corners thereof in generally paired opposing relationship,
    each of said wheels pivotable relative to said frame,
    an engine mounted to said frame,
    a pump mounted to said frame and driven by said engine,
    said pump operative upon a supply of working fluid,
    a piston arm selectively operable by said working fluid,
    an elongated bar mounted longitudinally upon said frame and axially rotatable relative thereto,
    said bar having a plurality of levers depending outwardly therefrom,
    a first of said levers mounted along the length thereof to said piston arm,
    a second of said levers operable with a pair of said wheels to cause the pivot thereof.
12. The invention of claim 11 wherein
    a third of said levers operable with a second pair of said wheels to cause the pivot thereof.
13. The invention of claim 11 wherein
    a reversible valve associated with said pump to direct the flow of said working fluid,
    duct means communicating with said reversible valve,
    said duct means communicating with a plurality of motors,
    each of said motors associated with a wheel and pivotable therewith relative to said frame,
    each of said wheels operable by one of said associated motors,
    each of said motors driven by said working fluid.
14. The invention of claim 13 wherein
    a third of said levers operable with a second pair of said wheels to cause the pivot thereof,
    said pairs of said wheels pivot in opposing directions.
15. The invention of claim 11 wherein
    said elongated bar is mounted generally along the midline of said frame.
16. The invention of claim 11 wherein
    a reversible valve associated with said pump to direct the flow of said working fluid,
    duct means communicating with said reversible valve,
    said duct means communicating with a plurality of motors,
    each of said motors associated with a wheel and pivotable therewith relative to said frame,
    each of said wheels operable by one of said associated motors, each of said motors driven by said working fluid, a third of said levers operable with a second pair of said wheels to cause the pivot thereof, said pairs of said wheels pivot in opposing directions, said elongated bar is mounted generally along the midline of said frame.

17. The invention of claim 16 wherein each of said wheels is mounted to said frame by a yoke having spaced apart arms, each of said yokes is pivotable upon said frame, each of said motors is a hydraulic motor mounted between said spaced apart arms, said second of said levers is interconnected with said pair of wheels by connecting rods pivotingly joined to the yokes associated with said pair of wheels, said third of said levers is interconnected with said second pair of wheels by connecting rods pivotingly joined to the yokes associated with said second pair of wheels.

18. Tractor apparatus comprising a frame supported by a plurality of wheels, each wheel being pivotable upon the frame, an engine mounted to the frame to drive a hydraulic pump which operates on a supply of working fluid, valve means associated with the hydraulic pump to control movement of the working fluid through ducts communicating with the valve means, each wheel having a hydraulic motor associated therewith which is in communication with the working fluid ducts, an elongated bar mounted upon the frame and rotatable upon its axis, a plurality of levers outwardly extending from the elongated bar and connected to rods connected to the wheels, an arm outwardly extending from the elongated bar and operatively connected with a piston arm selectively operated by the working fluid.

19. The invention of claim 18 wherein said elongated bar is mounted substantially along the longitudinal midline of the frame.

20. Steering mechanism for a four-wheel drive vehicle having a frame and supporting wheels each of which is pivotable relative to said frame about a substantially vertical axis, comprising an elongated bar mounted to the frame and axially rotatable thereupon, the elongated bar having a plurality of outwardly extending arms mounted thereto, piston means connected with a first of said arms to selectively apply torsional moment to the elongated bar, a second outwardly extending arm connected to connecting rods associated with an opposing pair of the wheels, the connecting rods transmitting pivotal forces to the wheels upon rotation of the elongated bar.

21. The invention of claim 20 wherein said vehicle is provided with four wheels in opposing pairs, a third outwardly extending arm connected to second connecting rods associated with a second pair of the wheels, said second connecting rods transmitting pivotal forces to the second pair of wheels upon rotation of the elongated bar.

22. The invention of claim 14 wherein the elongated bar is mounted to the frame generally along the midline thereof.

* * * * *